United States Patent
Yokoohji et al.

(10) Patent No.: US 9,665,327 B1
(45) Date of Patent: May 30, 2017

(54) METHOD FOR MANAGING AND ROUTING PRINT JOBS

(71) Applicant: KONICA MINOLTA LABORATORY U.S.A., INC., San Mateo, CA (US)

(72) Inventors: Ryoichi Yokoohji, San Mateo, CA (US); Danny Naoshi Kumamoto, Garden Grove, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/980,949

(22) Filed: Dec. 28, 2015

(51) Int. Cl.
  *G06F 3/12* (2006.01)
  *H04N 1/00* (2006.01)

(52) U.S. Cl.
  CPC ............ *G06F 3/126* (2013.01); *G06F 3/1205* (2013.01); *G06F 3/1211* (2013.01); *G06F 3/1273* (2013.01); *G06F 3/1288* (2013.01); *H04N 1/00408* (2013.01)

(58) Field of Classification Search
  None
  See application file for complete search history.

(56) References Cited

U.S. PATENT DOCUMENTS

| | | | | |
|---|---|---|---|---|
| 6,476,927 B1 * | 11/2002 | Schwarz, Jr. | ......... | G06F 3/1205 358/1.13 |
| 6,973,597 B2 * | 12/2005 | Schroath | ................ | G06K 15/00 399/18 |
| 7,450,259 B2 * | 11/2008 | Gassho | ................ | G06F 11/008 358/1.13 |
| 8,854,669 B1 * | 10/2014 | Jazayeri | ................ | G06F 3/1204 358/1.15 |
| 9,026,642 B2 * | 5/2015 | Maki | ..................... | H04L 43/028 358/1.15 |
| 2008/0005331 A1 | 1/2008 | Shiraishi | | |

* cited by examiner

*Primary Examiner* — Paul F Payer
(74) *Attorney, Agent, or Firm* — Chen Yoshimura LLP (57) ABSTRACT

Disclosed is a print job management method that provides efficient managing, routing and processing of print jobs amongst multiple printers. By first ranking the printers based on one or more positive and negative history factors as well as a user intention associated with a print job, and then selecting a destination printer from the ranked printers, the print job management method disclosed herein significantly reduces the evaluation workload in locating the best printer for each print job.

20 Claims, 12 Drawing Sheets

Flow chart (main routine)

Fig. 1 System Block Diagram

Fig. 2 Block Diagram of Server

Fig. 3 Block Diagram of Client

Fig. 4  Block Diagram of Printer

Fig. 5 Flow chart (main routine)

Fig. 6 Flow chart (Sub routine)

Fig.7 Job execution history table

| Job ID | Printer | Paper size | 1 side / 2 side | Total side count | Product type | Color mode | Operator ID | Assigning method |
|---|---|---|---|---|---|---|---|---|
| 001 | printer 1 | 8 1/2x11 | 2 side | 200 | perfect bind | color | Amy | Auto |
| 002 | printer 1 | 8 1/2x11 | 1 side | 400 | perfect bind | black & white | Amy | Manual |
| 004 | printer 2 | A4 | 2 side | 10 | None | color | Amy | Auto |
| 005 | printer 3 | 11x17 | 1 side | 1 | None | black & white | Amy | Auto |
| 006 | printer 5 | A4 | 1 side | 5 | None | color | Amy | Auto |
| 008 | printer 2 | A3 | 1 side | 30 | center folding | color | Amy | Manual |
| 009 | printer 1 | 8 1/2x11 | 2 side | 100 | None | color | Brian | Auto |
| 010 | printer 4 | 8 1/2x11 | 2 side | 50 | ring bind | black & white | Brian | Manual |
| ⋮ | ⋮ | ⋮ | ⋮ | ⋮ | ⋮ | ⋮ | ⋮ | ⋮ |

Fig. 8 Error history table

| Job ID | Printer | Paper size | 1 side / 2 side | error type |
|---|---|---|---|---|
| 003 | printer 3 | A3 | 2 side | jam |
| 007 | printer 2 | 11x17 | 2 side | jam |
| 0011 | printer 5 | A4 | 2 side | jam |
| ⋮ | ⋮ | ⋮ | ⋮ | ⋮ |

Fig. 13 per paper size x paper side error count

| Paper size | 8 1/2x11 | 11x17 | A4 | A3 | 8 1/2x11 | 11x17 | A4 | A3 |
|---|---|---|---|---|---|---|---|---|
| Paper side | 1 side | | | | 2 side | | | |
| printer 1 | ... | ... | ... | ... | 0 | ... | ... | ... |
| printer 2 | ... | ... | ... | ... | 5 | ... | ... | ... |
| printer 3 | ... | ... | ... | ... | 1 | ... | ... | ... |
| printer 4 | ... | ... | ... | ... | 0 | ... | ... | ... |
| printer 5 | ... | ... | ... | ... | 1 | ... | ... | ... |

Fig. 9-1 per paper size x paper side job count

| Paper size | 8 1/2x11 | 11x17 | A4 | A3 | 8 1/2x11 | 11x17 | A4 | A3 |
|---|---|---|---|---|---|---|---|---|
| Paper side | 1 side | | | | 2 side | | | |
| printer 1 | ... | ... | ... | ... | 75 | ... | ... | ... |
| printer2 | ... | ... | ... | ... | 1 | ... | ... | ... |
| printer 3 | ... | ... | ... | ... | 20 | ... | ... | ... |
| printer 4 | ... | ... | ... | ... | 30 | ... | ... | ... |
| printer 5 | ... | ... | ... | ... | 5 | ... | ... | ... |

Fig. 9-2 per product type job count

| | Perfect bind | Ring bind | Folding | ... |
|---|---|---|---|---|
| printer 1 | 23 | ... | ... | ... |
| printer 2 | 0 | ... | ... | ... |
| printer 3 | 0 | ... | ... | ... |
| printer 4 | 5 | ... | ... | ... |
| printer 5 | 1 | ... | ... | ... |

Fig. 9-3 per side count range job count

| | 1-10 | 11-20 | 21-50 | 51-100 | 101-300 | 301- |
|---|---|---|---|---|---|---|
| printer 1 | ... | ... | ... | 15 | ... | ... |
| printer2 | ... | ... | ... | 0 | ... | ... |
| printer 3 | ... | ... | ... | 0 | ... | ... |
| printer 4 | ... | ... | ... | 0 | ... | ... |
| printer 5 | ... | ... | ... | 2 | ... | ... |

Fig. 9-4 per color mode job count

| | Color | black & white |
|---|---|---|
| printer 1 | 55 | ... |
| printer 2 | 5 | ... |
| printer 3 | 15 | ... |
| printer 4 | 20 | ... |
| printer 5 | 10 | ... |

Fig. 9-5 Error count

| | Error Count |
|---|---|
| printer 1 | 0 |
| printer2 | 5 |
| printer 3 | 8 |
| printer 4 | 0 |
| printer 5 | 1 |

Fig. 9-6 per user job count

| | Amy | Brian | ... |
|---|---|---|---|
| printer 1 | 10 | ... | ... |
| printer 2 | 2 | ... | ... |
| printer 3 | 1 | ... | ... |
| printer 4 | 0 | ... | ... |
| printer 5 | 0 | ... | ... |

Fig. 10-1 Job to be assigned

| Job ID | Printer | Paper size | 1 side / 2 side | Total side count | Product type | Color mode | Operator ID | Assigning method |
|---|---|---|---|---|---|---|---|---|
| 450 | Not yet assined | 8 1/2x11 | 2 side | 70 | perfect bind | color | Amy | Auto |

Fig. 10-2 per paper size x paper side job count

| Paper size | 8 1/2x11 | 11x17 | A4 | A3 | 8 1/2x11 | 11x17 | A4 | A3 |
|---|---|---|---|---|---|---|---|---|
| Paper side | 1 side | | | | 2 side | | | |
| printer 1 | ... | ... | ... | ... | 5 | ... | ... | ... |
| printer2 | ... | ... | ... | ... | 1 | ... | ... | ... |
| printer 3 | ... | ... | ... | ... | 20 | ... | ... | ... |
| printer 4 | ... | ... | ... | ... | 30 | ... | ... | ... |
| printer 5 | ... | ... | ... | ... | 5 | ... | ... | ... |

Fig. 10-3 per product type job count

| | Perfect bind | Ring bind | Folding | ... |
|---|---|---|---|---|
| printer 1 | 15 | ... | ... | ... |
| printer 2 | 0 | ... | ... | ... |
| printer 3 | 0 | ... | ... | ... |
| printer 4 | 0 | ... | ... | ... |
| printer 5 | 2 | ... | ... | ... |

Fig. 10-4 per side count range job count

| | 1-10 | 11-20 | 21-50 | 51-100 | 101-300 | 301- |
|---|---|---|---|---|---|---|
| printer 1 | ... | ... | ... | 23 | ... | ... |
| printer2 | ... | ... | ... | 0 | ... | ... |
| printer 3 | ... | ... | ... | 0 | ... | ... |
| printer 4 | ... | ... | ... | 5 | ... | ... |
| printer 5 | ... | ... | ... | 1 | ... | ... |

Fig. 10-5 per color mode job count

| | Color | black & white |
|---|---|---|
| printer 1 | 55 | ... |
| printer 2 | 5 | ... |
| printer 3 | 15 | ... |
| printer 4 | 20 | ... |
| printer 5 | 10 | ... |

Fig. 10-6 Error count

| | Error Count |
|---|---|
| printer 1 | 0 |
| printer2 | 5 |
| printer 3 | 8 |
| printer 4 | 0 |
| printer 5 | 1 |

Fig. 10-7 per user job count

| | Amy | Brian | ... |
|---|---|---|---|
| printer 1 | 10 | ... | ... |
| printer 2 | 2 | ... | ... |
| printer 3 | 1 | ... | ... |
| printer 4 | 0 | ... | ... |
| printer 5 | 0 | ... | ... |

Fig. 11-1 Job to be assigned

| Job ID | Printer | Paper size | 1 side / 2 side | Total side count | Product type | Color mode | Operator ID | Assigning method |
|---|---|---|---|---|---|---|---|---|
| 450 | Not yet assined | 8 1/2x11 | 2 side | 70 | perfect bind | color | Amy | Auto |

Fig. 11-2 Rank based on (paper size, paper side) = (8 1/2x11, 2 side)

| Printer | Job count | Rank |
|---|---|---|
| printer 1 | 75 | 5 |
| printer 2 | 1 | 1 |
| printer 3 | 20 | 3 |
| printer 4 | 30 | 4 |
| printer 5 | 5 | 2 |

Fig. 11-3 Rank based on (Product type) = (perfect bind)

| Printer | Job count | Rank |
|---|---|---|
| printer 1 | 15 | 5 |
| printer 2 | 0 | 0 |
| printer 3 | 0 | 0 |
| printer 4 | 0 | 0 |
| printer 5 | 2 | 4 |

Fig. 11-4 Rank based on (total side count) = (51-100)

| Printer | Job count | Rank |
|---|---|---|
| printer 1 | 23 | 5 |
| printer 2 | 0 | 0 |
| printer 3 | 0 | 0 |
| printer 4 | 5 | 4 |
| printer 5 | 1 | 3 |

Fig. 11-5 Rank based on (color mode) = (color)

| Printer | Job count | Rank |
|---|---|---|
| printer 1 | 55 | 5 |
| printer 2 | 5 | 1 |
| printer 3 | 15 | 3 |
| printer 4 | 20 | 4 |
| printer 5 | 10 | 2 |

Fig. 11-6 Rank based on Error count

| Printer | Error count | Rank |
|---|---|---|
| printer 1 | 0 | 0 |
| printer 2 | 5 | -4 |
| printer 3 | 8 | -5 |
| printer 4 | 0 | 0 |
| printer 5 | 1 | -3 |

Fig. 11-7 Rank based on User intent (user) = (Amy)

| Printer | Job count | Rank |
|---|---|---|
| printer 1 | 10 | 5 |
| printer 2 | 2 | 4 |
| printer 3 | 1 | 3 |
| printer 4 | 0 | 0 |
| printer 5 | 0 | 0 |

Fig. 11-8 Combined Rank

| Printer | Positive factor | | | | Negative factor | User Intent rank | Sum of each rank | Combined Rank |
|---|---|---|---|---|---|---|---|---|
| | Paper size/side rank | Product type rank | Total Side count rank | Color mode rank | Error rank | | | |
| printer 1 | 5 | 5 | 5 | 5 | 0 | 5 | 25 | 5 |
| printer 2 | 1 | 0 | 0 | 1 | -3 | 3 | 2 | 1 |
| printer 3 | 3 | 0 | 0 | 3 | -5 | 4 | 5 | 2 |
| printer 4 | 4 | 0 | 4 | 4 | 0 | 0 | 12 | 4 |
| printer 5 | 2 | 4 | 3 | 2 | -4 | 0 | 7 | 3 |

Fig. 12-1 Job to be assigned

| Job ID | Printer | Paper size | 1 side / 2 side | Total side count | Product type | Operator ID | Assigning method |
|---|---|---|---|---|---|---|---|
| 450 | Not yet assined | 8 1/2x11 | 2 side | 70 | perfect bind | Amy | Auto |

Fig. 12-2 Rank based on (paper size, paper side) = (8 1/2x11, 2 side)

| Printer | Job count | Rank |
|---|---|---|
| printer 1 | 75 | 5.0 |
| printer2 | 1 | 0.1 |
| printer 3 | 20 | 1.3 |
| printer 4 | 30 | 2.0 |
| printer 5 | 5 | 0.3 |

Fig. 12-3 Rank based on (Product type) = (perfect bind)

| Printer | Job count | Rank |
|---|---|---|
| printer 1 | 15 | 5.0 |
| printer2 | 0 | 0.0 |
| printer 3 | 0 | 0.0 |
| printer 4 | 0 | 0.0 |
| printer 5 | 2 | 0.7 |

Fig. 12-4 Rank based on (total side count) = (51-100)

| Printer | Job count | Rank |
|---|---|---|
| printer 1 | 23 | 5.0 |
| printer2 | 0 | 0.0 |
| printer 3 | 0 | 0.0 |
| printer 4 | 5 | 1.1 |
| printer 5 | 1 | 0.2 |

Fig. 12-5 Rank based on (color mode) = (color)

| Printer | Job count | Rank |
|---|---|---|
| printer 1 | 55 | 5.0 |
| printer2 | 5 | 0.5 |
| printer 3 | 15 | 1.4 |
| printer 4 | 20 | 1.8 |
| printer 5 | 10 | 0.9 |

Fig. 12-6 Rank based on Error count

| Printer | Error count | Rank |
|---|---|---|
| printer 1 | 0 | 0.0 |
| printer2 | 5 | -3.1 |
| printer 3 | 8 | -5.0 |
| printer 4 | 0 | 0.0 |
| printer 5 | 1 | -0.6 |

Fig. 12-7 Rank based on User intent (user) = (Amy)

| Printer | Job count | Rank |
|---|---|---|
| printer 1 | 10 | 5.0 |
| printer2 | 2 | 1.0 |
| printer 3 | 1 | 0.5 |
| printer 4 | 0 | 0.0 |
| printer 5 | 0 | 0.0 |

Fig. 12-8 Combined rank

| Printer | Positive factor | | | | Negative factor | User Intent rank | Sum of each rank | Combined Rank |
|---|---|---|---|---|---|---|---|---|
| | Paper size/side rank | Product type rank | Total Side count rank | Color mode rank | Error rank | | | |
| printer 1 | 5.0 | 5.0 | 5.0 | 5.0 | 0.0 | 5.0 | 25.0 | 5 |
| printer 2 | 0.1 | 0.0 | 0.0 | 0.5 | -3.1 | 1.0 | -1.6 | 2 |
| printer 3 | 1.3 | 0.0 | 0.0 | 1.4 | -5.0 | 0.5 | -1.8 | 1 |
| printer 4 | 2.0 | 0.0 | 1.1 | 1.8 | 0.0 | 0.0 | 4.9 | 4 |
| printer 5 | 0.3 | 0.7 | 0.2 | 0.9 | -0.6 | 0.0 | 1.5 | 3 |

|  |  |  |  | Weight | |
|---|---|---|---|---|---|
| Positive factor | | ⦿ ON | ◎ OFF | 50 | % |
| | ☑ paper size x paper side | | | | |
| | ☑ product type | | | | |
| | ☐ total page count | | | | |
| | ☑ Color mode | | | | |
| Negative factor | | ⦿ ON | ◎ OFF | 30 | % |
| User intent | | ◎ ON | ⦿ OFF | 20 | % |

Fig. 14 Mode setting display

METHOD FOR MANAGING AND ROUTING PRINT JOBS

BACKGROUND OF THE INVENTION

Field of the Invention

This invention relates to print job management solutions, and in particular, it relates to a method for efficient managing and routing print jobs amongst multiple printers by ranking the printers based on certain positive and negative print history factors and selecting the destination printer from the ranked printers.

Description of Related Art

Nowadays most print processing systems have adopted some kind of auto mode algorithms executed in their servers. Such auto mode algorithm is designed to help the server automatically route each received print job to its destination printer for printing. To that end, usually the auto mode algorithm provides some evaluation mechanism that can figure out which printer is the best printer to process each print job. However, the evaluation mechanism tends to involve too many factors and the underlying logic can be very complicated. When the number of printers in the print processing system keeps increasing, the processing time of print jobs in the auto mode can slow down considerably. Therefore, a need exists for an improved print job management method that can simplify the process of locating the best printer for each print job. Another need also exists to enhance existing auto mode algorithms so that print jobs can be routed and processed more efficiently.

SUMMARY

Accordingly, the present invention is directed to an improved print job management method that substantially obviates one or more of the problems due to limitations and disadvantages of the related art.

An object of the present invention is to enhance existing auto mode algorithms for processing print jobs by simplifying their evaluation mechanisms in locating the best printer and routing print jobs more efficiently.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a print job management method, which comprises receiving a print job at a server in communication with a plurality of printers; ranking the plurality of printers based on a job execution history and an error history of each printer, wherein the job execution history comprises at least one positive history factor, and the error history comprises at least one negative history factor; evaluating each of the plurality of printers, in an descending order of the ranks, to determine whether the printer matches a job setting of the print job; determining one of the plurality of printers matches the job setting; and routing the print job to the matched printer for printing. In one embodiment, the print job management method further comprises repeating the evaluation step by selecting a top-ranked printer from unevaluated printers and determining whether the selected printer matches the job setting until either one matched printer is identified or all printers are evaluated. In another embodiment, the print job management method further comprises maintaining a job execution history table comprising entries of completed print jobs, each entry having a job ID, printer information and different positive factors defining a print job; and maintaining an error history table comprising entries of job errors, each entry having a job ID, printer information and a negative factor defining an error type.

In another aspect, the present invention provides a computer program product comprising a computer usable non-transitory medium (e.g. memory or storage device) having a computer readable program code embedded therein for controlling a data processing system, the data processing system comprising a computer and one or more printers, the computer readable program code configured to cause the computer in the data processing system to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 9-1 to 9-6 demonstrate exemplary job counts of each printer according to different positive and negative factors, as well as user intent according to embodiments of the present invention.

FIGS. 10-1 to 10-7 demonstrate an exemplary print job to be assigned and job counts of each printer according to the positive and negative factors, as well as user intent of the exemplary print job according to embodiments of the present invention.

FIGS. 11-1 to 11-8 demonstrate one example how to rank the printers based on the positive and negative factors, as well as user intent according to embodiments of the present invention.

FIGS. 12-1 to 12-8 demonstrate yet another example how to rank the printers based on the positive and negative factors, as well as user intent according to embodiments of the present invention.

DETAILED DESCRIPTION OF PREFERRED EMBODIMENTS

Embodiments of the present invention are directed to a print job management method that provides enhanced efficiency in routing and processing of print jobs in a print processing system. Particularly, one embodiment of the present invention simplifies the current process of locating the best printer for each print job by first ranking the printers based on one or more positive and negative history factors and then selecting the destination printer from the ranked printers, which significantly reduces the evaluation workload in order to identify the matching printer.

Figure 1:
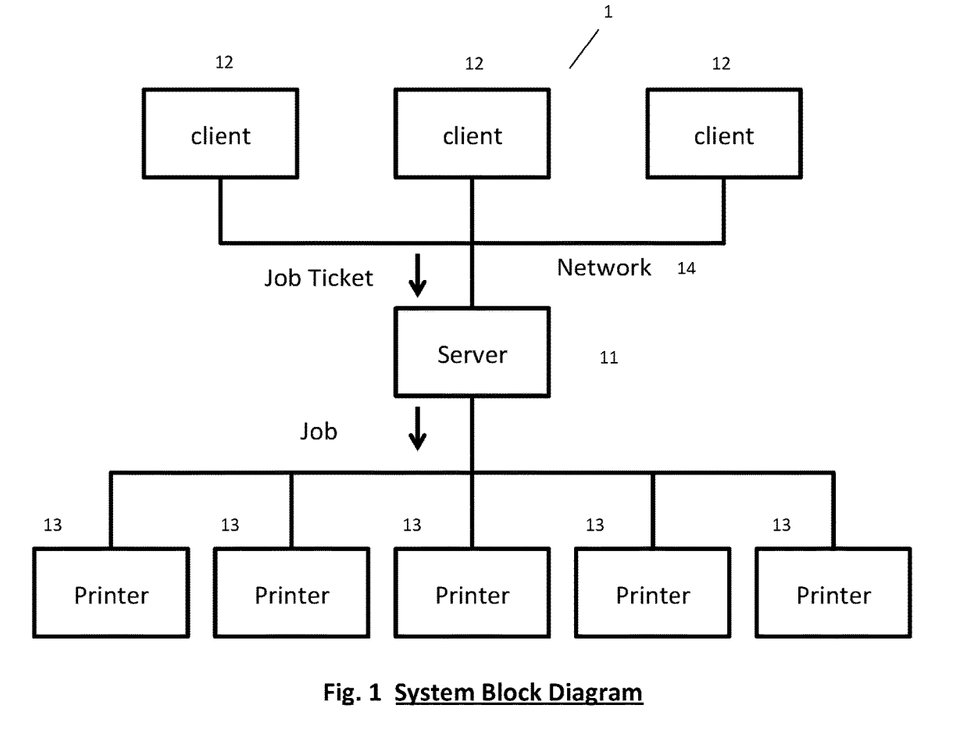
FIG. 1 is a block diagram providing an overview of a print processing system in which embodiments of the present invention may be implemented.

FIG. 1 presents an overview of an exemplary print processing system in which embodiments of the present invention may be implemented. As shown in FIG. 1, this print processing system 1 comprises a server 11 connected with a number of client devices 12 on one hand, and on the other hand, multiple printers 13, over a communications network 14, such as a local area network (LAN) or wide area network (WAN) or the Internet. In operation, the server 11 receives print job tickets from the client devices 12, where each print job ticket usually contains specifications of one or more print jobs, such as the number of pages, page size, one-sided v. two-sided, etc. Then following certain processing algorithms, the server 11 determines the destination printer for each print job and routes the print job to its destination printer for printing.

Figure 2:
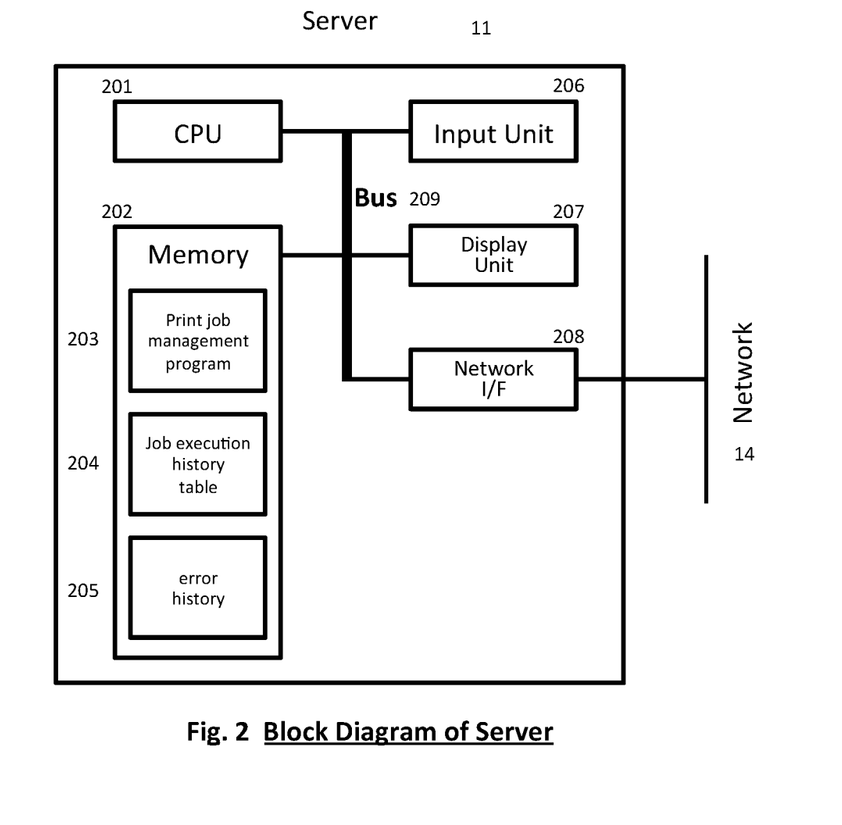
FIG. 2 is a block diagram illustrating an exemplary server in the system of FIG. 1 in which embodiments of the present invention may be implemented.

FIG. 2 illustrates an exemplary internal configuration of the server 11. As shown in FIG. 2, the server 11 comprises a central processing unit (CPU) 201, a memory 202, an input unit 206, a display unit 207 and a network interface 208, all of which communicating with each other through a bus 209.

Usually some print job management software is installed and run on the server 11, such as the printer job management program 203 in the memory 202, for automated managing, processing and routing print jobs. Preferably, such software is designed to run on Windows OS, Macintosh OS, or Unix X Windows or other popular computer operating systems implementing a GUI (graphic user interface), such as a touchscreen and/or a mouse and a keyboard, coupled with a display monitor. In addition to the print job management software 203, the memory 202 usually stores large amounts of print job data, including, without limitation, all the print jobs received at the server 11, specifications of all the printing/copying/scanning devices connected to the server 11 and user profiles therein, and information of each job that has been completed by a printer, which is recorded in the job execution history table 204 and error history table 205, as will be described in detail below with reference to FIGS. 7-8.

Besides the print job management software 203, the server 11 is also configured to execute other types of software (e.g., administrative software), applications (e.g., network communication application), operating systems, etc. In executing these software applications, the server 11 communicates with other components of the system in a LAN or WAN environment through the network interface 208, which is connected to a plurality of devices, such as the client devices 12 and printers 13 in FIG. 1.

Figure 3:
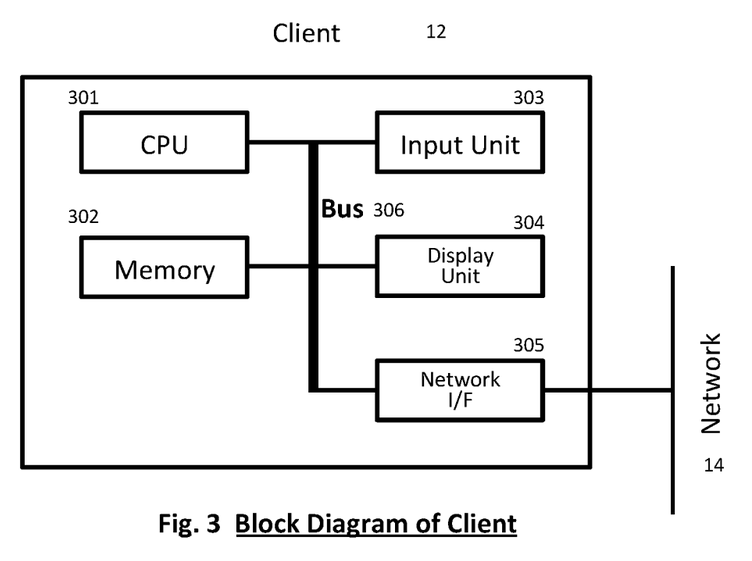
FIG. 3 is a block diagram illustrating an exemplary client device in the system of FIG. 1 in which embodiments of the present invention may be implemented.

FIG. 3 illustrates an exemplary client device as shown in the system of FIG. 1. As shown in FIG. 3, the client device 12 comprises a CPU 301, a memory 302, an input unit 303, a display unit 304 and a network interface (I/F) 305, all of which communicating with each other through a bus 306. The client device can be a computer, a tablet, a mobile phone, or any other terminal device that a user can use for submitting a print job to the server.

The printer devices 13 in the system of FIG. 1 may comprise, for example, B&W printers, color printers, scanners, multi-purpose printers, or combination thereof. Typically, each printer device has one or more display monitors to display the status of the printing and various warning and instruction messages to a user. Also, each printer device is usually equipped with its own central processing unit (CPU) and appropriate hardware/software to control its own printing operations.

Figure 4:
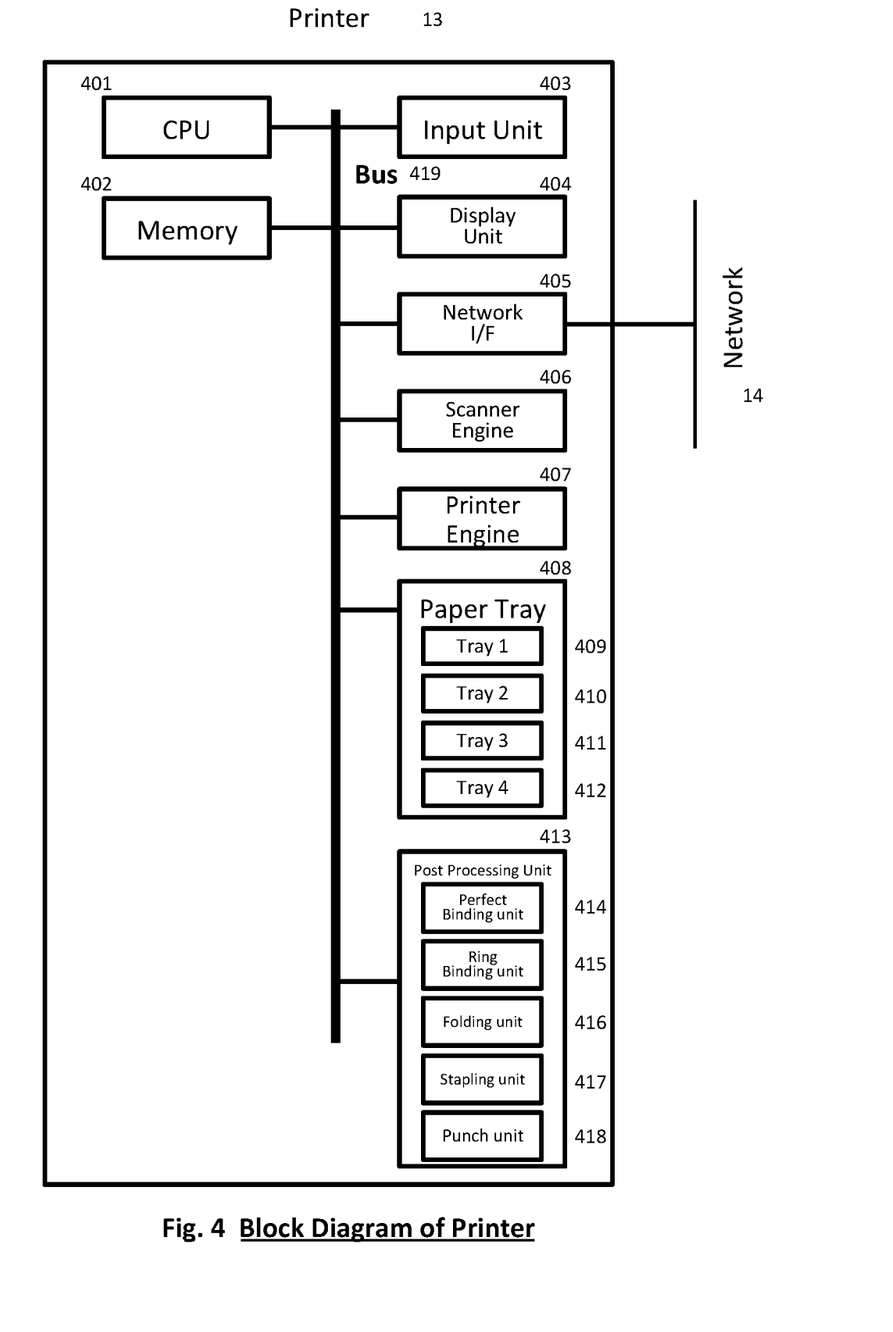
FIG. 4 is a block diagram illustrating an exemplary printer in the system of FIG. 1 in which embodiments of the present invention may be implemented.

FIG. 4 illustrates the internal configuration of an exemplary printer in the system of FIG. 1. As shown in FIG. 4, the printer 13 comprises a CPU 401, a memory 402, an input unit 403, a display unit 404, a network interface (I/F) 405, a scanner engine 406, a printer engine 407, a paper tray 408 and a post-processing unit 413. Again, all these units in the printer 13 communicate with each other through a bus 419.

Usually the paper tray 408 includes a plurality of paper trays, such as trays 409, 410, 411 to 412, each of which can store different types of paper, e.g., 8.5×11, 11×17, A4, A3, etc. With regard to the post-processing unit 413, some printers may comprise one or more post-processing units, such as a perfect binding unit 414, a ring binding unit 415, a folding unit 416, a stapling unit 417 and a punch unit 418, while other printers may not have any post-processing unit.

Figure 5:
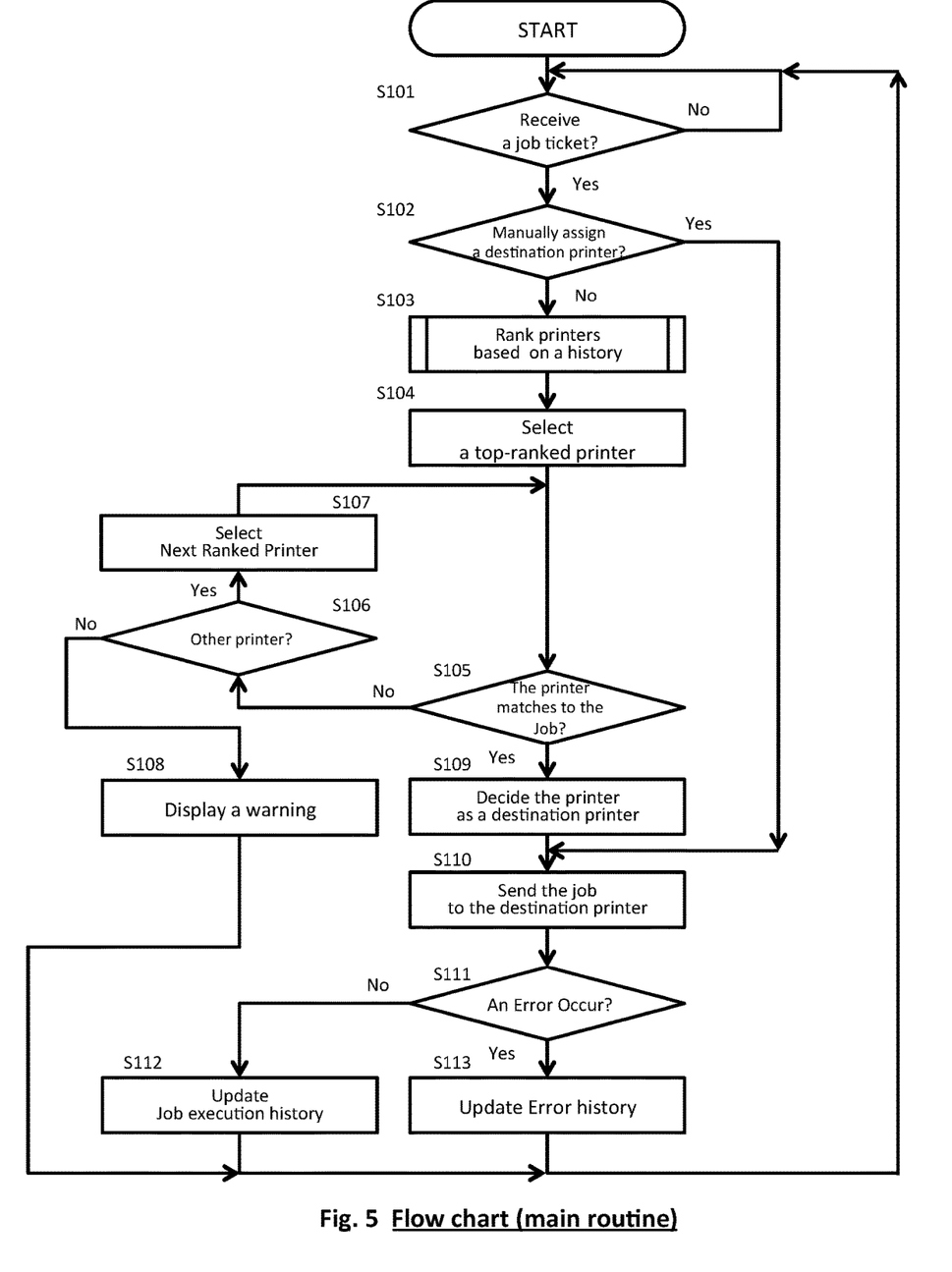
FIGS. 5-6 are flow chart diagrams illustrating a print job management program executed by the server of FIG. 2 for efficient routing and processing print jobs according to embodiments of the present invention.
Figure 6:
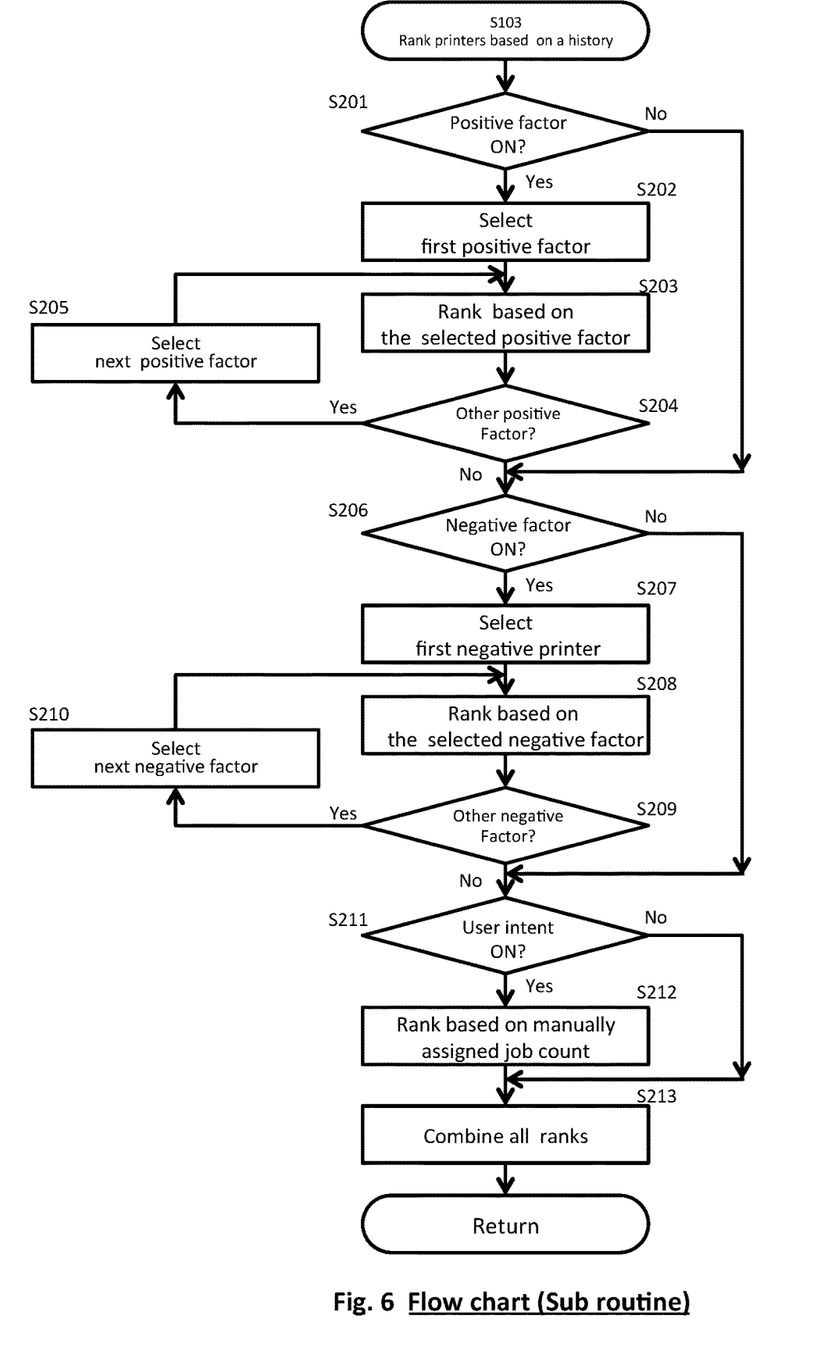

Referring now to FIGS. 5-6, provided therein is a flow diagram illustrating a print job management program, such as the printer job management program 203 in FIG. 2, which is typically executed by the server of a print processing system, such as the server 11 in FIGS. 1-2. As will be described below, such print job management program applies an improved printer processing algorithm that first ranks the multiple printers in the system (e.g., printers 13) based on their positive and negative history factors, and then determines from the ranked printers which is the best printer for any given printer job. As a result, the print job management program can assign and route print jobs to their destination printers more efficiently.

As shown in FIG. 5, the printer processing algorithm starts at step 101 (S101), where the server remains in a waiting mode until a job ticket from a client is received. Then at S102, the server decides whether to allow an operator to manually assign the received job to a printer. The server can make this decision based on the data setting that is already included in the job ticket, for example, when the data setting requires an input by the operator. Alternatively, the data setting can be configured in the server before the decision is made. If the server determines that the print job should be manually assigned by an operator, the process proceeds to S110 for routing the job ticket, otherwise it proceeds to S103 for ranking the printers according to embodiments of the invention.

At S103, the server ranks multiple printers based on their job execution histories. This step is further illustrated in FIG. 6. As will be described in detail below, by executing the ranking subroutine in FIG. 6, the server ranks the multiple printers based on at least one positive history factor (e.g., positive factors illustrated in FIGS. 9-1 to 9-4), at least one negative history factor (e.g., negative factors illustrated in FIG. 9-5), as well as the user intent (e.g., the intent illustrated in FIG. 9-6).

Figure 7:
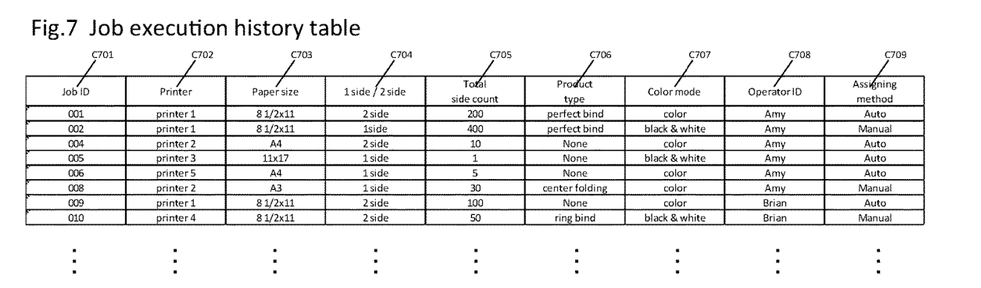
FIG. 7 illustrates an exemplary job execution history table comprising one or more positive history factors for ranking printers according to embodiments of the present invention.

As aforementioned, the print processing system stores information of each completed print job in a job execution history table, such as the one illustrated in FIG. 7. Each entry of this table contains categorized information of a completed job, including a job ID C701 (e.g., 001, 002 . . . etc.), a printer ID C702 (e.g., printer 1, printer 2 . . . etc.), the paper size C703 (e.g., 8.5×11, A4, 11×17 . . . etc.), 1 side or 2 side C704, a total page count C705 (e.g., 200, 400 . . . etc.), a product type C706 (e.g., perfect bind, center folding, etc.), a color mode C707 (e.g., color, b&w, etc.), an operator ID C708 (e.g., Amy, Brian, etc.), and an assigning method C709 (e.g., manual or auto, etc.).

Figure 8:
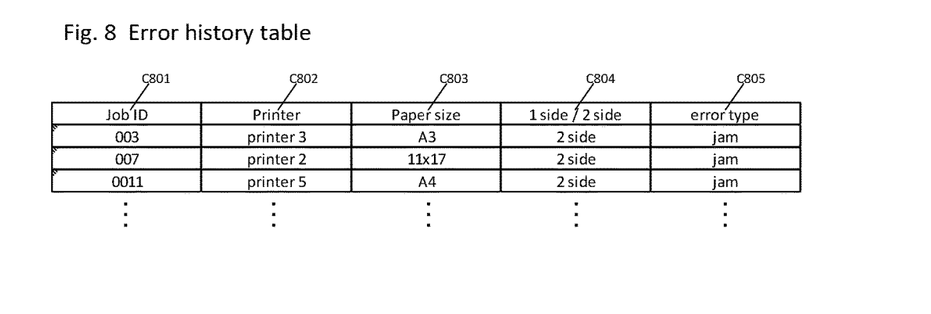
FIG. 8 illustrates an exemplary error history table comprising one or more negative history factors for ranking printers according to embodiments of the present invention.

The print processing system also stores information of each job that has caused an error, e.g., a paper jam. Such information may be recorded in a separate table as illustrated in FIG. 8. In this table, each entry contains information of a job with error, including a job ID C801 (e.g., 003, 007, 0011 . . . etc.), a printer ID C802 (e.g., printer 3, printer 2 . . . etc.), the paper size C803 (e.g., A3, 11×17 . . . etc.), 1 side or 2 side C804, and an error type C805 (e.g., jam). If a printer is fixed and maintained to have a clean status, for example, a service person maintains a printer or an imaging unit is exchanged by a user or a service person, then the error history table in FIG. 8 will be updated by removing error entries of that printer.

Based on the job execution history information of each print job in the tables of FIGS. 7 and 8, the job history of each printer is presented in different categories or pursuant to different positive and negative factors, as shown in FIGS. 9-1 to 9-6.

Figure 91:
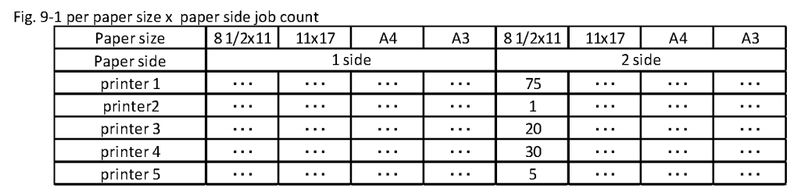

For example, FIG. 9-1 presents the job history information for each printer pursuant to a positive factor of "paper size and the paper side." As shown in FIG. 9-1, out of all completed jobs requiring the paper size of 8.5×11 and 2-side, printer 1 has a total job count of 75, printer 2 has a total job count of 1, printer 3 has 20, printer 4 has 30, and printer 5 has 5. For completed jobs requiring a different paper size and paper side, the job count for each printer (not shown) may also be determined from the history information in the tables of FIGS. 7 and 8.

Figure 92:
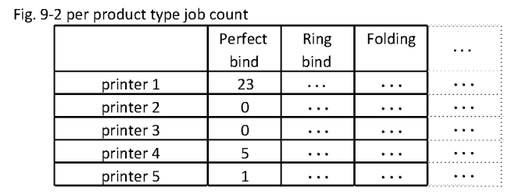

FIG. 9-2 presents the job history information for each printer pursuant to another positive factor of "product type." Specifically, for completed print jobs requiring a product type of "perfect bind," printer 1 has a job count of 23, printer 2 has none, printer 3 has none, printer 4 has a job count of 5, and printer 5 has a job count of 1.

Figure 93:
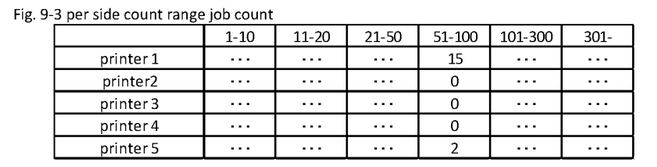

FIG. 9-3 presents the job history information for each printer according to the positive factor of "per side count range." By "per side count," the system counts the total sides rather than pages in a print job. For example, if a print job contains 15 pages for double-sided printing, the total side count will be 30(=15×2). For completed print jobs having a per side count range of 51-100, printer 1 has a job count of 15, printers 2, 3 and 4 have none, and printer 5 has a job count of 1.

Figure 94:
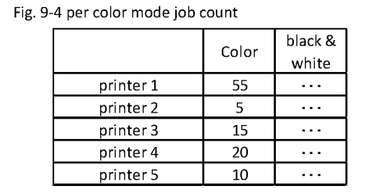

FIG. 9-4 presents the job history for each printer according to the positive factor of "color mode." For completed print jobs requiring a "color" mode, printer 1 has a job count of 55, printer 2 has 5, printer 3 has 15, printer 4 has a job count of 20, and printer 5 has a job count of 10.

Figure 13:
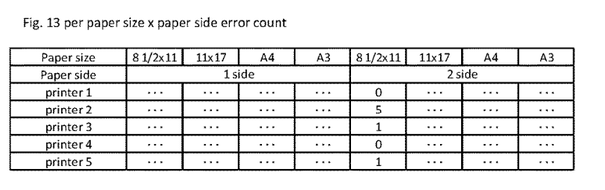
FIG. 13 illustrates an alternative error history table according to embodiments of the present invention.
Figure 95:
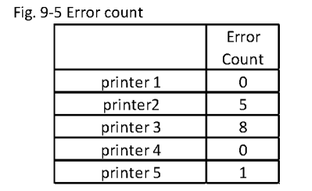

FIG. 9-5 presents the job history information for each printer pursuant to a negative factor of "error count." As shown in FIG. 9-5, in the history of processing and completing the print jobs, printer 1 has 0 error, printer 2 has 5 errors, printer 3 has 8 errors, printer 4 has 0 error, and printer 5 has 1 error. FIG. 13 presents another embodiment of the error history for each printer. As seen in FIG. 13, the error history is per "paper size & paper side" error count of each computer, i.e., for all print jobs requiring "8.5×11" and 2-side, printer 1 has 0 error, printer 2 has 5 errors, printer 3 has 1 error, printer 4 has 0, and printer 5 has 1 error.

Figure 96:
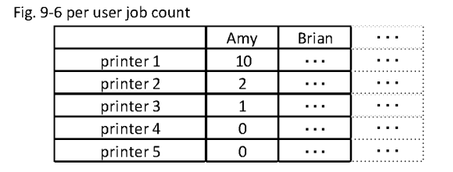
Figure 101:
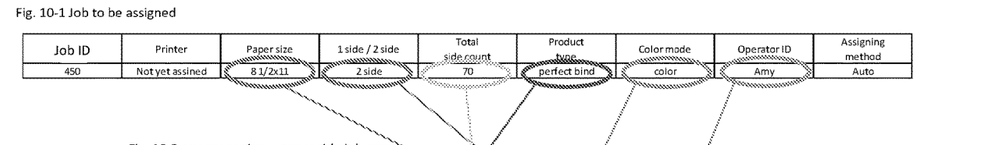

Another way to review job history information of each printer is by "user" or "user intent." As shown in FIG. 9-6, printer 1 has completed 10 jobs manually assigned by the user "Amy," printer 2 has completed 2 jobs by "Amy," printer 3 has completed 1 job by "Amy," and printers 4 and 5 haven't processed any jobs from "Amy."

Figure 14:
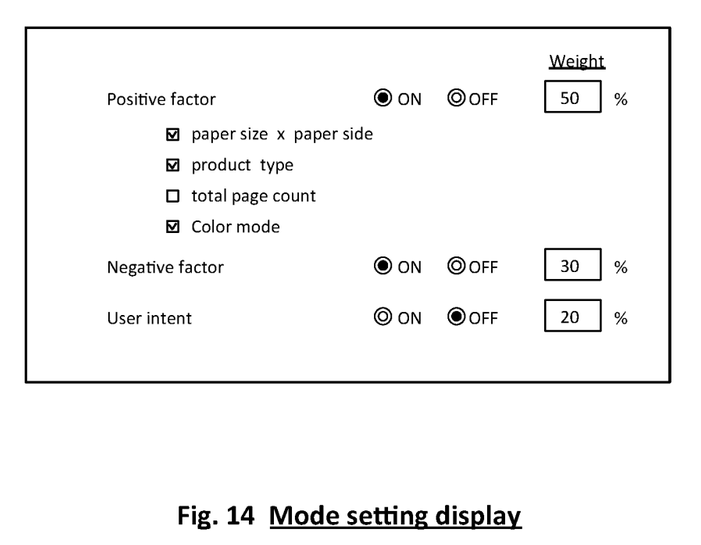
FIG. 14 illustrates an exemplary user interface for assigning weights to different positive and negative factors for ranking printers according to embodiments of the present invention.

In operation, the server uses one or more of the above-mentioned positive and negative history factors, as well as the user intent in ranking the printers, as will be described below with reference to FIG. 6. In one embodiment, the user can customize which positive or negative factors to be considered in ranking the printers, for example, through a mode setting display as demonstrated in FIG. 14. In this display, the user can select in advance, by setting "on" or "off," whether the server should consider a positive factor, a negative factor or the user intent in ranking the printers. In addition, the user can determine what weights to give to the positive factor, the negative factor and user intent, for example, 50%, 30% and 20%, respectively. For various positive factors, the user can further decide which one or more of the positive factors should be considered in ranking the printers.

Back to FIG. 6, the printer ranking process starts at step 201 (S201), where the server determines whether any positive factor should be considered. In one configuration, the server can make the decision based on the user's previous selection in the mode setting display, as explained above. If the server determines that no positive factor should be considered, the ranking process will proceed to S206 directly, bypassing all positive factors in the job history of the printers. But if one or more positive factor should be considered, the server selects the first positive factor at S202, and then ranks the printers based on the selected first positive factor at S203. At S204, the server determines whether there are other positive factors to consider, and if so, at S205, the server ranks the printers again based on the selected second positive factor. This process repeats until there are no more positive factors to consider in ranking the printers, in which case the process proceeds to S206.

Steps S206-S211 in FIG. 6 are used for the server to rank printers in the system based on one or more negative history factors, e.g., "error count." Specifically, the server obtains the error count of each printer in the execution history and then ranks the printers accordingly. After all the negative factors are considered for ranking the printers, the process continues to S211, where the server decides whether user intent should be considered in ranking the printers. If yes, the server ranks the printers based on the manually-assigned job counts of each printer at S212.

At S213, the server combines all the ranks above per different factors or user intent by adding up all ranks for each printer. As a result, the combined ranks will be used to ultimately rank the printers. In combining individual ranks for each printer, one embodiment allows a user to assign different weights to each of the ranks by setting different coefficients. In this case, each individual rank per a positive or negative factor or user intent is first multiplied by the assigned coefficient or weight, and then added up to obtain the combined rank for each printer.

To further illustrate how the server ranks different printers according to subroutine in FIG. 6, an exemplary job to be assigned amongst 5 printers in the system will be described in detail below. As shown in FIG. 10-1 (also in FIGS. 11-1 and 12-1), the job to be assigned has a job ID of "450" and other specifications as follows: paper size of "8.5×11," 2-side, a total page/side count of 70, product type of "perfect bind," color mode of "color," manual operator ID of "Amy" and an assigning method of "Auto."

Figure 102:
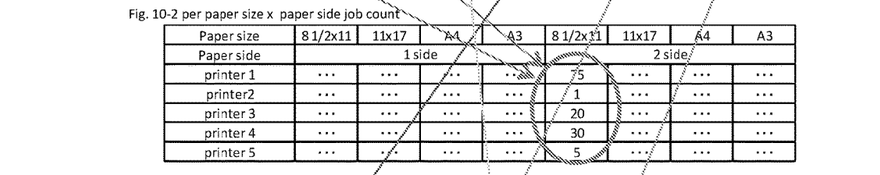
Figure 112:
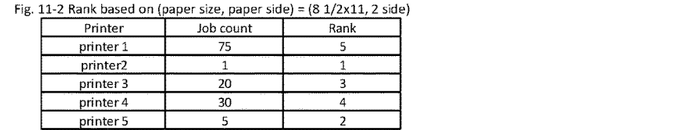

The server first ranks the printers 1-5 based on the positive factor of "paper size & paper side," which, more specifically, is 8.5×11 and 2-side in the job to be assigned. FIG. 10-2 shows the job history of each printer per "paper size & paper side." Specifically, for print jobs requiring paper size 8.5×11 and 2-side, printers 1-5 have job counts of 75, 1, 20, 30, and 5, respectively. As such, the printers are ranked according to their respective job counts in FIG. 11-2, namely, printer 1 with the highest job count of 75 is ranked as the highest of 5, and printer 2 with the lowest job count of 1 is given the lowest rank of 1. Likewise, printers 3, 4 and 5 are ranked as 3, 4, 2, respectively, based on their job counts.

Figure 103:
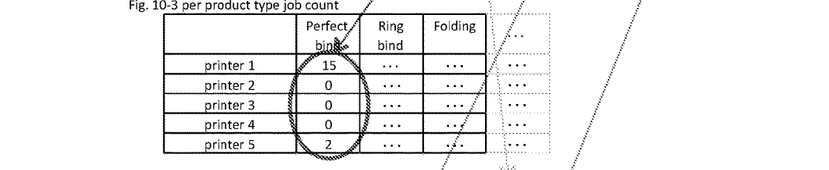
Figure 113:
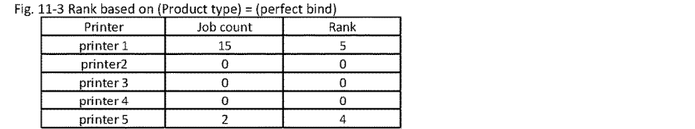

Then the server ranks the printers 1-5 based on another positive factor of "product type," which is "perfect bind" in the job to be assigned. As shown in FIG. 10-3, for completed jobs requiring a product type of "perfect bind," printers 1-5 have respective job counts of 15, 0, 0, 0 and 2. Accordingly, these printers are ranked as 5, 0, 0, 0 and 4, respectively, as shown in FIG. 11-3. It should be noted that because printers 2, 3 and 4 have zero job count of "perfect bind," their ranks are both set to zero (0).

Figure 104:
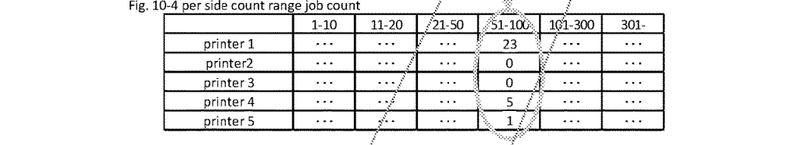
Figure 114:
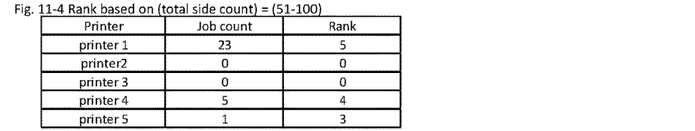

Next, the server ranks the printers 1-5 based on the positive factor of "total side count," which, in the job to be assigned, is 70, falling within the range of 51-100. In FIG. 10-4, the job history of each printer is presented for jobs having a total side count of 51-100. Based on the job history (23, 0, 0, 5, 1), the printers 1-5 are ranked as 5, 0, 0, 3 and 3, respectively, as shown in FIG. 11-4.

Figure 105:
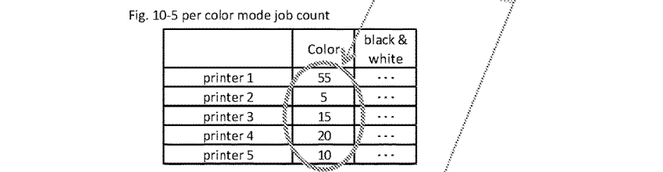
Figure 115:
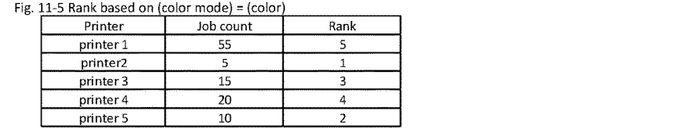

The server also ranks the printers 1-5 based on the positive factor of "color mode," which, in the job to be assigned, is set as "color." Based on the job counts in FIG. 10-5, the printers 1-5 are ranked as 5, 1, 3, 4 and 2, respectively, as shown in FIG. 11-5.

Figure 106:
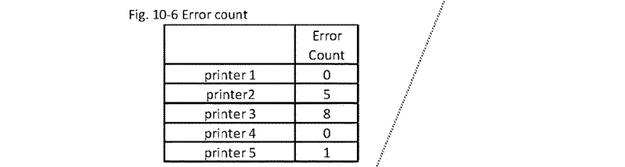
Figure 116:
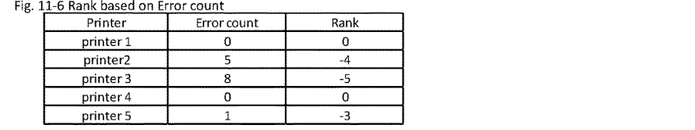

In addition, the server considers the negative factor of "error count" in ranking the printers 1-5. As shown in FIG. 10-6, printers 1-5 have respective error counts of 0, 5, 8, 0 and 1. As a result, these printers are ranked as 0, −4, −5, 0 and −3, respectively, as seen in FIG. 11-6. Notably, printer 3 has the highest count of errors and thus is ranked as the lowest, i.e., −5. Because printers 1 and 4 have zero (0) error, they have the same ranking of 0.

Figure 107:
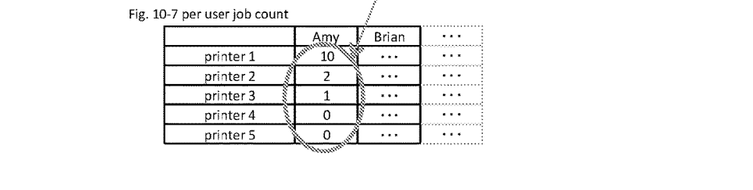
Figure 111:
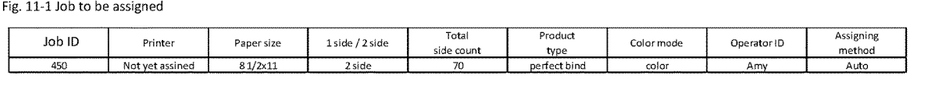
Figure 117:
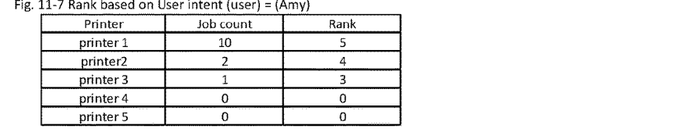
Figure 118:
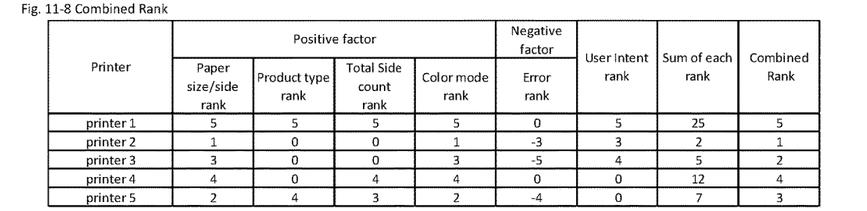

The job to be assigned also contains a user or operator ID for manually assigning the job. So the server also ranks the printers based on the user intent, which is "Amy" according to the job to be assigned. As shown in FIG. 10-7, the job counts of printers 1-5 per "Amy" are 10, 2, 1, 0 and 0, and thus, their rankings are 5, 4, 3, 0 and 0, respectively, as shown in FIG. 11-7.

As mentioned above, one step in FIG. 6 is to combine the individual ranks in FIGS. 11-2 to 11-7 for each printer, and the combined ranks are used to ultimately rank the printers. FIG. 11-8 shows the combined ranks for each printer. In combining the individual ranks, the server adds up the ranks per each positive factor, negative factor and user intent for each printer. As a result, printers 1-5 have a combined rank of 5, 1, 2, 4 and 3.

FIGS. 12-1 to 12-8 present an alternative method in determining the individual ranks per each positive factor, negative factor and user intent for each printer. As shown in FIG. 12-2, for printers 1-5, the original ranks 5, 1, 3, 4 and 2 as shown in FIG. 11-2 are normalized to be 5.0, 0.1, 1.3, 2.0 and 0.3, respectively. Similarly, the ranks in FIGS. 12-3 to 12-7 are normalized results of the original ranks. FIG. 12-8 shows the combined ranks for each printer. In combining the individual ranks, the server adds up the ranks per each positive factor, negative factor and user intent for each printer. As a result, printers 1-5 have a combined rank of 5, 1, 2, 4 and 3.

Back to FIG. 5, after the printers are ranked according to the subroutine in FIG. 6, the process proceeds to S104, where the server selects the top-ranked printer. Then, at S105, the server determines whether the selected printer matches the job setting of the received print job. If not, the process continues to evaluate the next ranked printer until one of the multiple printers matches the job setting. If there is no printer matching the job setting, the server displays a warning on the display unit at S108. If a printer is determined to match the job setting, the server decides the printer to be the destination printer at S109. At S110, the server sends the job to the destination printer. At S111, the server determines whether an error occurs while the job is being printed. If so, the server will update the error history table, such as the one in FIG. 8 or FIG. 13. If no error occurs, the server will update the job execution table, such as the one in FIG. 7.

It will be apparent to those skilled in the art that various modification and variations can be made in the above-described method and system of the present invention without departing from the spirit or scope of the invention. Thus, it is intended that the present invention cover modifications and variations that come within the scope of the appended claims and their equivalents.

What is claimed is:

1. A print job management method comprising:
   receiving a print job at a server in communication with a plurality of printers, wherein each printer has a job execution history comprising at least one positive history factor and an error history comprising at least one negative history factor, and the print job is defined by a print job ticket comprising specifications of different factors applicable to the print job;
   ranking the plurality of printers by:
   determining, based in part on the specifications in the print job ticket, which positive or negative history factor to be used in ranking the printers,
   obtaining individual ranks for each printer according to each positive history factor and negative history factor, and
   for each printer, combining its individual ranks to obtain a combined rank, wherein the combined rank is used for ranking the printer;
   evaluating each of the plurality of printers, in an descending order of the ranks, to determine whether the printer matches a job setting of the print job;
   determining one of the plurality of printers matches the job setting; and
   routing the print job to the matched printer for printing.

2. The print job management method of claim 1, wherein each of the individual ranks comprises a numeric value or a normalized value.

3. The print job management method of claim 1, further comprising:
   determining none of the plurality of printers matches the job setting of the print job; and
   displaying a warning to a user.

4. The print job management method of claim 1, further comprising:
   repeating the evaluation step by selecting a top-ranked printer from unevaluated printers and determining whether the selected printer matches the job setting until either one matched printer is identified or all printers are evaluated.

5. The print job management method of claim 1, further comprising:

maintaining a job execution history table comprising entries of completed print jobs, each entry having a job ID, printer information and different positive factors defining a print job; and maintaining an error history table comprising entries of job errors, each entry having a job ID, printer information and a negative factor defining an error type.

6. The print job management method of claim 5, further comprising:

if the print job is printed successfully at the matched printer, updating the job execution history table accordingly; and if an error occurs at the matched printer with regard to the print job, updating the error history table accordingly.

7. The print job management method of claim 1, wherein the factors of the print job ticket comprise at least one positive history factor and one negative history factor.

8. A print job management method comprising:

receiving a print job at a server in communication with a plurality of printers;

ranking the plurality of printers based on a job execution history and an error history of each printer, wherein the job execution history comprises at least one positive history factor, and the error history comprises at least one negative history factor;

evaluating each of the plurality of printers, in an descending order of the ranks, to determine whether the printer matches a job setting of the print job;

determining one of the plurality of printers matches the job setting;

routing the print job to the matched printer for printing; and providing a display unit that allows a user to determine whether to use any positive history factor, negative history factor or user intention in ranking the plurality of printers, wherein the display unit further allows the user to select, amongst multiple positive and negative history factors, which factor to be used in ranking the plurality of printers.

9. The print job management method of claim 8, wherein the display unit further allows the user to assign different weights to different positive and negative history factors in ranking the plurality of printers.

10. The print job management method of claim 8, wherein the print job is defined by a print job ticket comprising specifications of different factors applicable to the print job, the factors of the print job ticket comprising at least one of the positive history factor, the negative history factor and a user intention.

11. A computer program product comprising a computer usable non-transitory medium having a computer readable program code embedded therein for controlling a data processing system, the data processing system including at least a computer and one or more printers, the computer readable program code configured to cause the computer of the data processing system to execute a process for managing print jobs in a printing system comprising a plurality of printers, the process comprising:

receiving a print job, wherein each printer has a job execution history comprising at least one positive history factor and an error history comprising at least one negative history factor, and the print job is defined by a print job ticket comprising specifications of different factors applicable to the print job;

ranking the plurality of printers by:

determining, based in part on the specifications in the print job ticket, which positive or negative history factor to be used in ranking the printers, obtaining individual ranks for each printer according to each positive history factor and negative history factor, and for each printer, combining its individual ranks to obtain a combined rank, wherein the combined rank is used for ranking the printer;

evaluating each of the plurality of printers, in an descending order of the ranks, to determine whether the printer matches a job setting of the print job;

determining one of the plurality of printers matches the job setting; and routing the print job to the matched printer for printing.

12. The computer program product of claim 11, wherein the process further comprises:

receiving a print job at a server in communication with a plurality of printers;

ranking the plurality of printers based on a job execution history and an error history of each printer, wherein the job execution history comprises at least one positive history factor, and the error history comprises at least one negative history factor;

evaluating each of the plurality of printers, in a descending order of the ranks, to determine whether the printer matches a job setting of the print job;

determining one of the plurality of printers matches the job setting;

routing the print job to the matched printer for printing; and providing a display unit that allows a user to determine whether to use any positive history factor, negative history factor or user intention in ranking the plurality of printers, wherein the display unit further allows the user to select, amongst multiple positive and negative history factors, which factor to be used in ranking the plurality of printers.

13. The computer program product of claim 12, wherein the display unit further allows the user to assign different weights to different positive and negative history factors in ranking the plurality of printers.

14. The print job management method of claim 12, wherein the print job is defined by a print job ticket comprising specifications of different factors applicable to the print job, the factors of the print job ticket comprising at least one of the positive history factor, the negative history factor and a user intention.

15. The computer program product of claim 11, wherein each of the individual ranks comprises a numeric value or a normalized value.

16. The computer program product of claim 11, wherein the process further comprises:

determining none of the plurality of printers matches the job setting of the print job; and displaying a warning to a user.

17. The computer program product of claim 11, wherein the process further comprises:

repeating the evaluation step by selecting a top-ranked printer from unevaluated printers and determining whether the selected printer matches the job setting until either one matched printer is identified or all printers are evaluated.

18. The computer program product of claim 11, wherein the process further comprises:

maintaining a job execution history table comprising entries of completed print jobs, each entry having a job ID, printer information and different positive factors defining a print job; and maintaining an error history table comprising entries of job errors, each entry having a job ID, printer information and a negative factor defining an error type.

19. The computer program product of claim 18, wherein the process further comprises:

if the print job is printed successfully at the matched printer, updating the job execution history table accordingly; and if an error occurs at the matched printer with regard to the print job, updating the error history table accordingly.

20. The computer program product of claim 11, wherein the factors of the print job ticket comprise at least one positive history factor and one negative history factor.

* * * * *